United States Patent
Mabuchi et al.

(10) Patent No.: US 8,078,364 B2
(45) Date of Patent: Dec. 13, 2011

(54) VEHICLE SEAT APPARATUS

(75) Inventors: Teiji Mabuchi, Aichi-ken (JP); Osamu Fujimoto, Nissin (JP); Kei Matsui, Toyota (JP); Yoshihiro Suda, Tokyo-to (JP); Yoshihiko Tabuchi, Nishinomiya (JP); Shoichiro Takehara, Yokohama (JP); Daisuke Yamaguchi, Tokyo-to (JP); Takaaki Koga, Tokyo-to (JP)

(73) Assignees: Toyota Jidosha Kabushiki Kaisha, Toyota-shi, Aichi-ken (JP); The University of Tokyo, Tokyo (JP)

( * ) Notice: Subject to any disclaimer, the term of this patent is extended or adjusted under 35 U.S.C. 154(b) by 423 days.

(21) Appl. No.: 12/339,681

(22) Filed: Dec. 19, 2008

(65) Prior Publication Data
US 2009/0164073 A1 Jun. 25, 2009

(30) Foreign Application Priority Data
Dec. 21, 2007 (JP) .................................. 2007-330981

(51) Int. Cl.
*B60N 2/14* (2006.01)
(52) U.S. Cl. ..................... 701/49; 296/65.18; 296/65.06; 296/65.07; 296/65.08; 701/209; 297/344.1; 297/344.21
(58) Field of Classification Search .................. 701/49, 701/36, 117, 118, 119, 200, 207, 208, 209, 701/210, 211, 212, 213; 296/65.18, 65.01, 296/65.06, 65.07, 65.08; 297/1, 61, 311, 297/312, 344.1, 256.12, 344.21
See application file for complete search history.

(56) References Cited

U.S. PATENT DOCUMENTS

| | | | | |
|---|---|---|---|---|
| 3,554,130 | A * | 1/1971 | Broggie et al. | 104/75 |
| 7,477,976 | B2 * | 1/2009 | Horii et al. | 701/49 |
| 7,561,951 | B2 * | 7/2009 | Rao et al. | 701/48 |
| 7,568,822 | B2 * | 8/2009 | Ibrahim | 362/466 |
| 7,640,090 | B2 * | 12/2009 | Uchida et al. | 701/49 |
| 2007/0078598 | A1 * | 4/2007 | Watanabe et al. | 701/211 |

(Continued)

FOREIGN PATENT DOCUMENTS
DE        100 22 434        11/2001
(Continued)

OTHER PUBLICATIONS
Office Action issued Aug. 18, 2009, in Japanese Appln. No. 2007-330981.

(Continued)

*Primary Examiner* — Paul N Dickson
*Assistant Examiner* — Karen A Beck
(74) *Attorney, Agent, or Firm* — Finnegan, Henderson, Farabow, Garrett & Dunner, LLP

(57) ABSTRACT

A vehicle seat apparatus includes: a vehicle seat; a swiveling drive unit that swivels the vehicle seat between the frontward-oriented position in which the vehicle seat faces the front of a vehicle and at least one of the outward-oriented position in which the vehicle seat is oriented in the outward direction of the vehicle and the inward-oriented position in which the vehicle seat is oriented in the inward direction of the vehicle; a traveling route information obtainment unit that obtains information on a traveling route along which the vehicle travels; and a control unit that controls the operation of the swiveling drive unit based on the information obtained by the traveling route information obtainment unit.

13 Claims, 13 Drawing Sheets

U.S. PATENT DOCUMENTS

| | | | |
|---|---|---|---|
| 2007/0276568 A1* | 11/2007 | Tozu | 701/49 |
| 2008/0054694 A1* | 3/2008 | Lhomme et al. | 297/256.12 |
| 2009/0055046 A1* | 2/2009 | Harumoto et al. | 701/36 |
| 2009/0105912 A1* | 4/2009 | Horii et al. | 701/49 |
| 2009/0164073 A1* | 6/2009 | Mabuchi et al. | 701/49 |
| 2009/0269175 A1* | 10/2009 | Rose et al. | 414/373 |
| 2010/0191426 A1* | 7/2010 | Miyajima et al. | 701/49 |
| 2010/0211304 A1* | 8/2010 | Hwang et al. | 701/200 |

FOREIGN PATENT DOCUMENTS

| | | |
|---|---|---|
| DE | 10 2005 022 818 | 11/2006 |
| DE | 10 2007 000 182 | 10/2007 |
| JP | 2003-532577 | 11/2003 |
| JP | 2004-182150 | 7/2004 |
| JP | 2005-225296 | 8/2005 |
| JP | 2005-349974 A | 12/2005 |
| JP | 2006-7834 | 1/2006 |
| JP | 2006-151117 A | 6/2006 |
| JP | 2007-38704 | 2/2007 |
| JP | 2007-261522 A | 10/2007 |
| JP | 2007-313969 | 12/2007 |
| JP | 2007-320446 | 12/2007 |
| JP | 2007-320447 | 12/2007 |

OTHER PUBLICATIONS

German Office Action for Appl. No. 10 2008 055 554.1-14 dated Jan. 14, 2011.

* cited by examiner

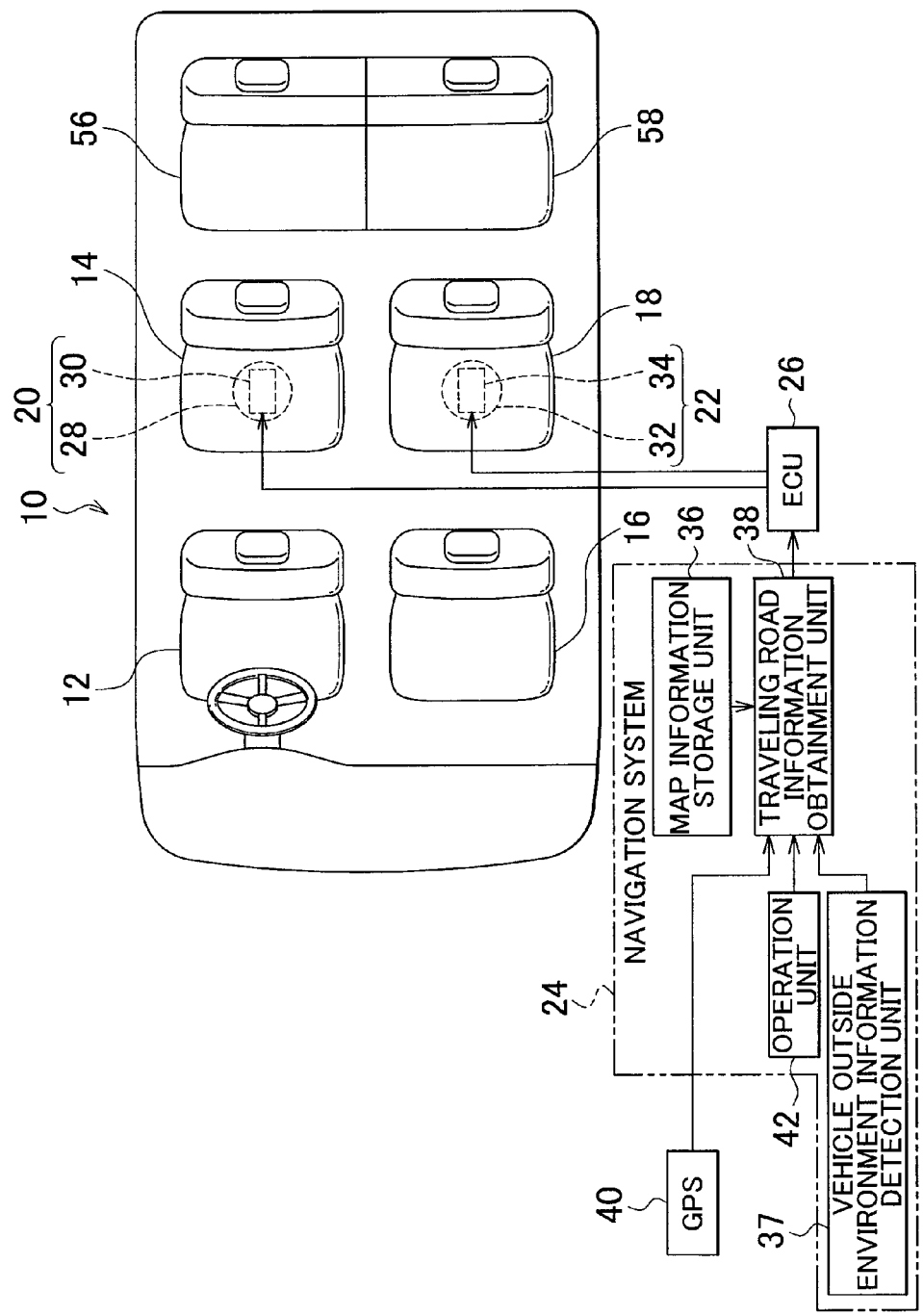

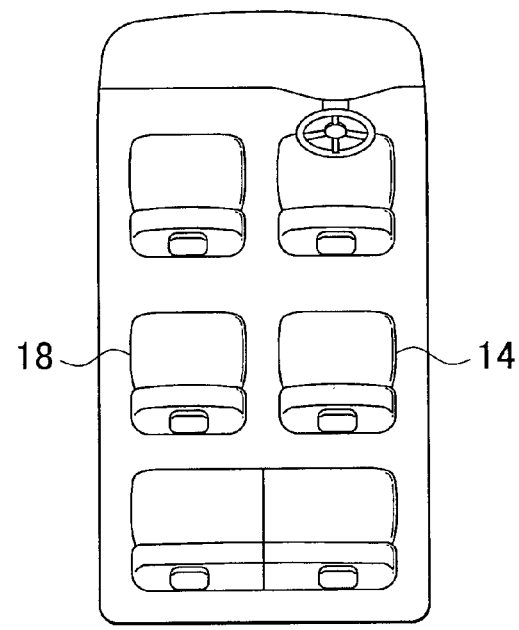
F I G . 6A
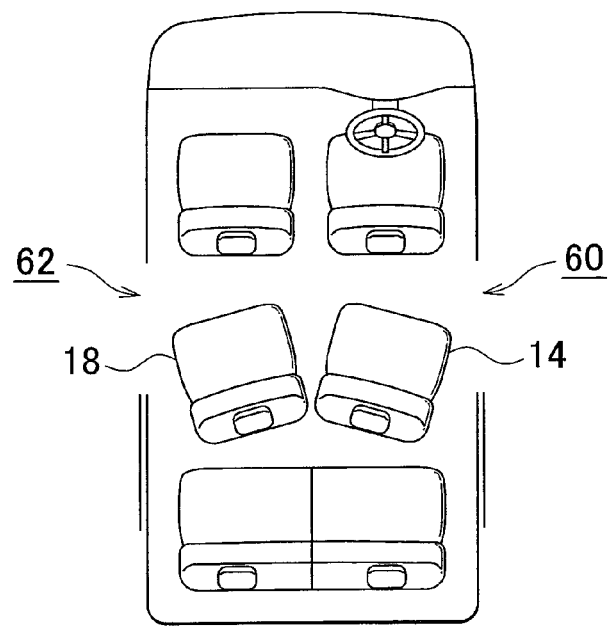
F I G . 6B

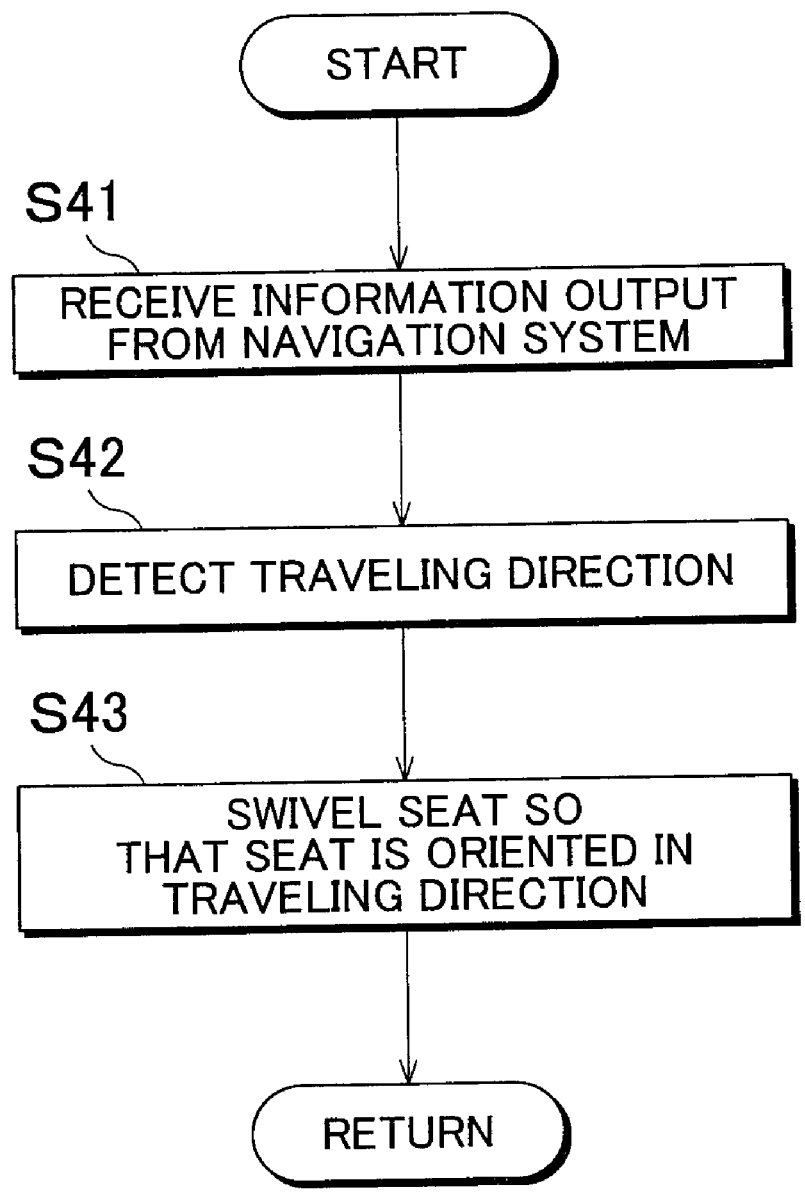

VEHICLE SEAT APPARATUS

INCORPORATION BY REFERENCE

The disclosure of Japanese Patent Application No. 2007-330981 filed on Dec. 21, 2007 including the specification, drawings and abstract is incorporated herein by reference in its entirety.

BACKGROUND OF THE INVENTION

1. Field of the Invention

The invention relates generally to a vehicle seat apparatus, and more specifically to a vehicle seat apparatus that is able to control an operation of a vehicle seat based on the information that is obtained by, for example, a navigation system.

2. Description of the Related Art

A vehicle seat apparatus of this type is described in, for example, Japanese Patent Application Publication No. 2006-7834 (JP-A-2006-7834). JP-A-2006-7834 describes an example of a vehicle seat control apparatus. According to JP-A-2006-7834, it is possible to control the tilt angle of a vehicle seat based on the information obtained with the use of a navigation system.

According to JP-A-2006-7834, it is possible to control the tilt angle of the vehicle seat based on the condition of a road on which a host vehicle is traveling. However, controlling the orientation of the vehicle seat based on the condition of the road on which the host vehicle is traveling is not taken into account at all. Accordingly, if the orientation of the vehicle seat is controlled based on the condition on which the host vehicle is traveling, comfort in a passenger compartment may be further improved.

SUMMARY OF THE INVENTION

The invention is made in light of the above-described circumstances. The invention provides a vehicle seat apparatus with which the comfort in a vehicle is further improved.

An aspect of the invention relates to a vehicle seat apparatus that includes: a vehicle seat; a swiveling drive unit that swivels the vehicle seat between the frontward-oriented position in which the vehicle seat faces the front of a vehicle and at least one of the outward-oriented position in which the vehicle seat is oriented in the outward direction of the vehicle and the inward-oriented position in which the vehicle seat is oriented in the inward direction of the vehicle; a traveling route information obtainment unit that obtains information on a traveling route along which the vehicle travels; and a control unit that controls the operation of the swiveling drive unit based on the information obtained by the traveling route information obtainment unit.

In the vehicle seat apparatus described above, the traveling route information obtainment unit obtains the information on the traveling route along which the vehicle travels. Then, the control unit controls the operation of the swiveling drive unit based on the information obtained by the traveling route information obtainment unit, whereby the vehicle seat is automatically swiveled between the frontward-oriented position and at least one of the outward-oriented position and the inward-oriented position.

With the vehicle seat apparatus described above, it is possible to automatically swivel the vehicle seat so that the orientation of the vehicle seat is suitable for the condition of the traveling route along which the vehicle travels. Accordingly, it is possible to further improve the comfort in the vehicle.

BRIEF DESCRIPTION OF THE DRAWINGS

The features, advantages and technical and industrial significance of this invention will be described in the following detailed description of an example embodiment of the invention with reference to the accompanying drawings, wherein the same or corresponding portions will be denoted by the same reference numerals and wherein:

FIG. 1 is a plane view showing the state in a passenger compartment of a vehicle to which a vehicle seat apparatus according to an embodiment of the invention is applied;

FIGS. 6A and 6B are views showing an example of the operation of the vehicle seat apparatus shown in FIG. 1;

FIG. 13 is a flowchart showing the routine executed by the ECU in the holding stability improvement mode.

DETAILED DESCRIPTION OF THE EMBODIMENT

Hereafter, an embodiment of the invention will be described with reference to the accompanying drawings. In the embodiment, a vehicle seat apparatus according to the invention is applied to an automobile, for example, a minivan.

Figure 2A:
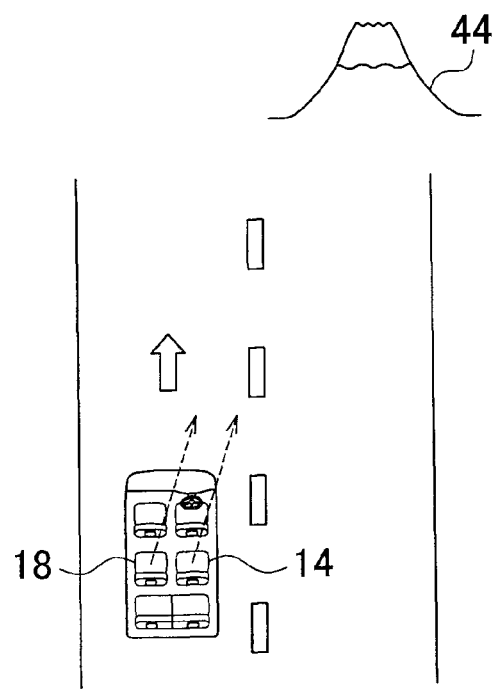
FIGS. 2A and 2B are views showing an example of the operation of the vehicle seat apparatus shown in FIG. 1.
Figure 2B:
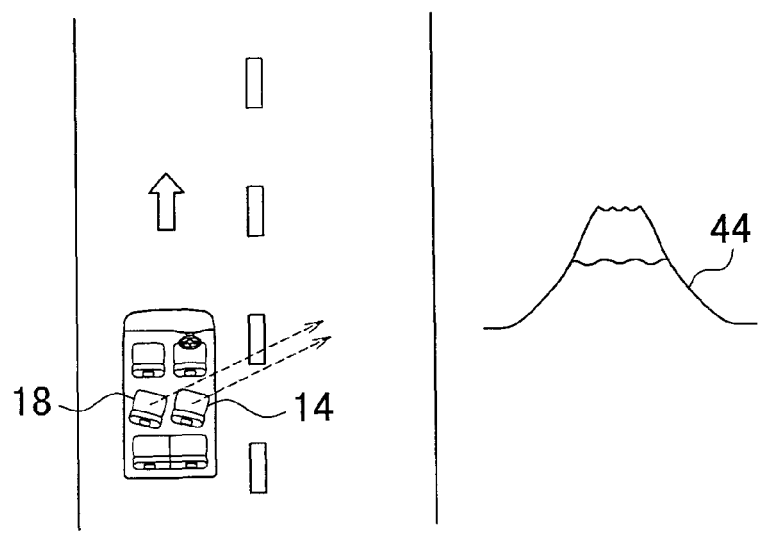

FIG. 1 is a plane view showing the state inside a passenger compartment of a vehicle to which a vehicle seat apparatus 10 according to the embodiment of the invention is applied. FIGS. 2A and 2B show an example of the operation of the vehicle seat apparatus 10.

The vehicle seat apparatus 10 according to the embodiment of the invention shown in FIG. 1 includes a second-row driver-side seat 14 that is arranged behind a driver's seat 12, a second-row passenger-side seat 18 that is arranged behind a passenger's seat 16, swiveling drive mechanisms 20 and 22, a navigation system 24, and an ECU (Electronic Control Unit) 26.

The swiveling drive mechanism 20 includes a swiveling support unit 28 and a motor drive unit 30. The swiveling support unit 28 supports the second-row driver-side seat 14 in such a manner that the second-row driver-side seat 14 is allowed to swivel with respect to a passenger compartment floor. In this way, the second-row driver-side seat 14 is in one of a frontward-oriented position in which the second-row driver-side seat 14 is oriented toward the front of the vehicle, an inward-oriented position which is reached when the second-row driver-side seat 14 is swiveled inward from the frontward-oriented position and in which the second-row driver-side seat 14 is oriented in the inward direction of the vehicle, and an outward-oriented position which is reached when the second-row driver-side seat 14 is swiveled outward from the frontward-oriented position and in which the second-row driver-side seat 14 is oriented in the outward direction of the vehicle. The motor drive unit 30 swivels the second-row driver-side seat 14 that is supported by the above-described swiveling support unit 28 so that the second-row driver-side seat 14 is in one of the frontward-oriented position, the inward-oriented position and the outward-oriented position, which is selected based on a control signal from the ECU 26.

Similarly, the swiveling drive mechanism 22 includes a swiveling support unit 32 and a motor drive unit 34. The swiveling support unit 32 supports the second-row passenger-side seat 18 in such a manner that the second-row passenger-side seat 18 is allowed to swivel with respect to the passenger compartment floor. In this way, the second-row passenger-side seat 18 is in one of a frontward-oriented position in which the second-row passenger-side seat 18 is oriented toward the front of the vehicle, an inward-oriented position which is reached when the second-row passenger-side seat 18 is swiveled inward from the frontward-oriented position and in which the second-row passenger-side seat 18 is oriented in the inward direction of the vehicle, and an outward-oriented position which is reached when the second-row passenger-side seat 18 is swiveled outward from the frontward-oriented position and in which the second-row passenger-side seat 18 is oriented in the outward direction of the vehicle. The motor drive unit 34 swivels the second-row passenger-side seat 18 that is supported by the above-described swiveling support unit 32 so that the second-row passenger-side seat 18 is in one of the frontward-oriented position, the inward-oriented position and the outward-oriented position, which is selected based on a control signal from the ECU 26.

The navigation system 24 includes a map information storage unit 36, a vehicle outside environment information detection unit 37, and a traveling road information obtainment unit 38.

The map information storage unit 36 is formed of a storage medium, for example, a CD-ROM, a DVD-ROM, or a hard disk. The map information storage unit 36 stores map information.

The vehicle outside environment information detection unit 37 includes, for example, a VICS (Vehicle Information and Communication System) information receiver, and detects the information on the vehicle outside environment in a road on which the host vehicle is traveling (for example, weather information, information on whether the host vehicle is traveling during the daytime or at night, and information on whether the traffic backs up).

The traveling road information obtainment unit 38 may be placed in the visual target information output mode or the traveling road information output mode, as will be described later in detail. The traveling road information obtainment unit 38 is placed in the visual target information output mode when the ECU 26 is in the visibility improvement mode. The traveling road information obtainment unit 38 is placed in the traveling road information output mode when the ECU 26 is in the motion sickness prevention mode or the holding stability improvement mode.

When placed in the visual target information output mode or the traveling road information output mode, the traveling road information obtainment unit 38 obtains the map information that includes the information on the road on which the host vehicle is currently traveling from the map information storage unit 36 based on the traveling location of the host vehicle that is obtained from a GPS 40, as described later in detail. The traveling road information obtainment unit 38 extracts the required information from the obtained map information, and outputs the required information to the ECU 26 as the result of information obtainment.

When the traveling road information obtainment unit 38 obtains the information on the vehicle outside environment in the road on which the host vehicle is currently traveling from the map information storage unit 36 based on the traveling location of the host vehicle that is obtained from the GPS 40 (for example, information that the road on which the host vehicle is currently traveling is a rough road or information that the host vehicle is traveling in a tunnel), or when the traveling road information obtainment unit 38 obtains the information on the vehicle outside environment (for example, information on weather in the area including the road on which the host vehicle is currently traveling, information on whether the host vehicle is traveling during the daytime or at night, or information whether the traffic backs up), the traveling road information obtainment unit 38 outputs the obtained information to the ECU 26 as the result of information obtainment.

As will be described later in detail, the ECU 26 may be placed in the visibility improvement mode, the motion sickness prevention mode or the holding stability improvement mode. When the visual target is input in the navigation system 24 through the use of an operation unit 42, the ECU 26 is basically placed in the visibility improvement mode. However, the mode of the ECU 26 may be switched from the visibility improvement mode to the motion sickness prevention mode or the holding stability improvement mode according to, for example, an algorithm that is set in advance based on the traveling state of the host vehicle.

The mode of the ECU 26 may be switched among the visibility improvement mode, the motion sickness prevention mode, and the holding stability improvement mode based on a command signal output from a mode selection switch (not shown) provided in the passenger compartment.

When placed in the visibility improvement mode, the motion sickness prevention mode, or the holding stability improvement mode, the ECU 26 controls the motor drive units 30 and 34 in the following manner based on the information output from the traveling road information obtainment unit 38.

Next, the effects of the vehicle seat apparatus 10 according to the embodiment of the invention will be described along with the operation of the ECU 26 in each mode.

First, the visibility improvement mode will be described. When an occupant inputs the destination into the navigation system 24 with the use of the operation unit 42, the traveling road information obtainment unit 38 searches for the route from the current location of the host vehicle to the destination.

Next, when the occupant selects a visual target which the occupant wants to see from among fine views such as mountains, coast lines and lakes, and artifacts such as buildings that are present on the route, and inputs the selected visual target into the navigation system 24 with the use of the operation unit 42, the traveling road information obtainment unit 38 sets the visual target, which is input in the navigation system 24 with the use of the operation unit 42, on the above-described route.

When the visual target is input in the navigation system 24 with the use of the operation unit 42 as described above, the ECU 26 is placed in the visibility improvement mode, and the traveling road information obtainment unit 38 is placed in the visual target information output mode.

Figure 9:
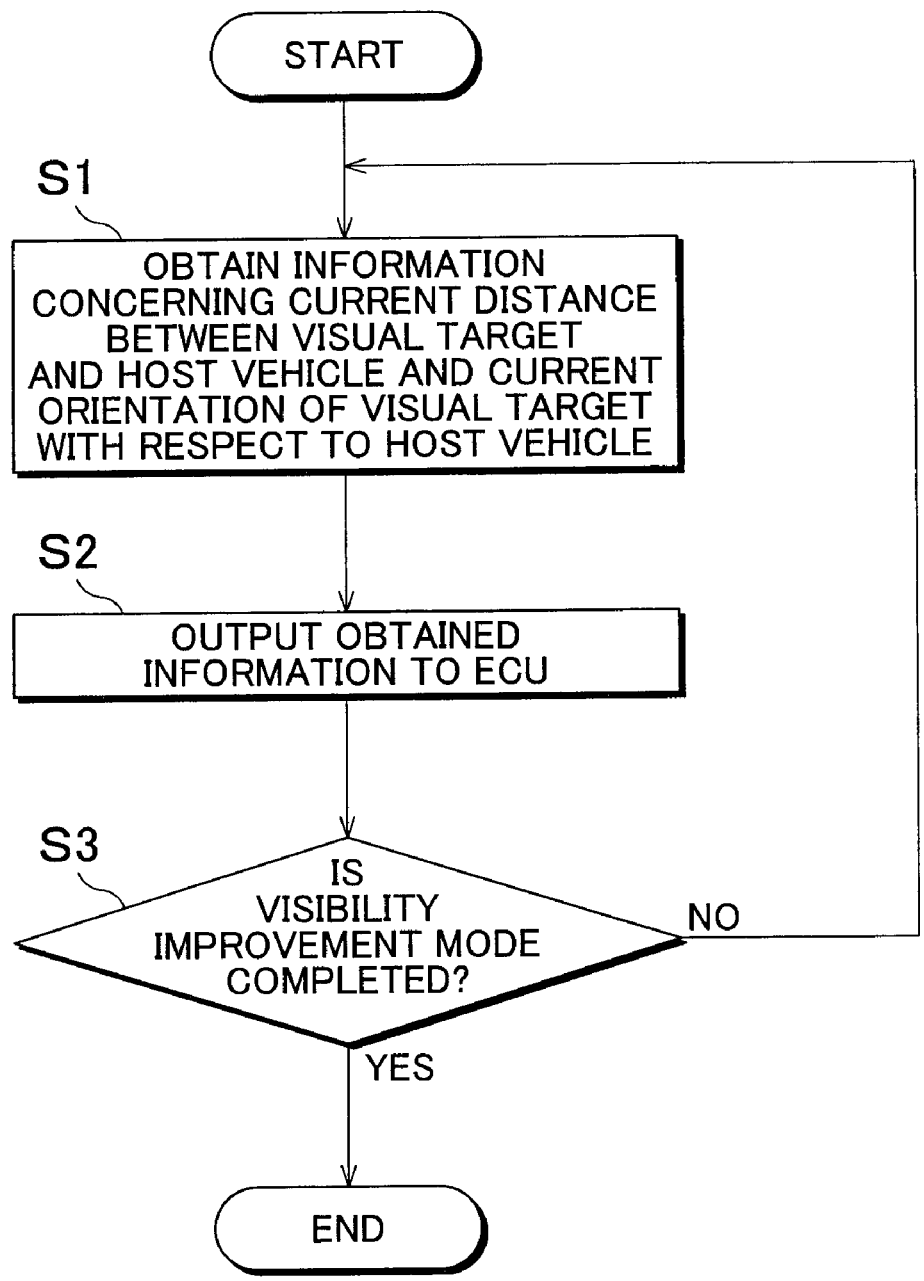
FIG. 9 is a flowchart showing the routine executed by a traveling road information obtainment unit in the visual target information output mode.
Figure 10:
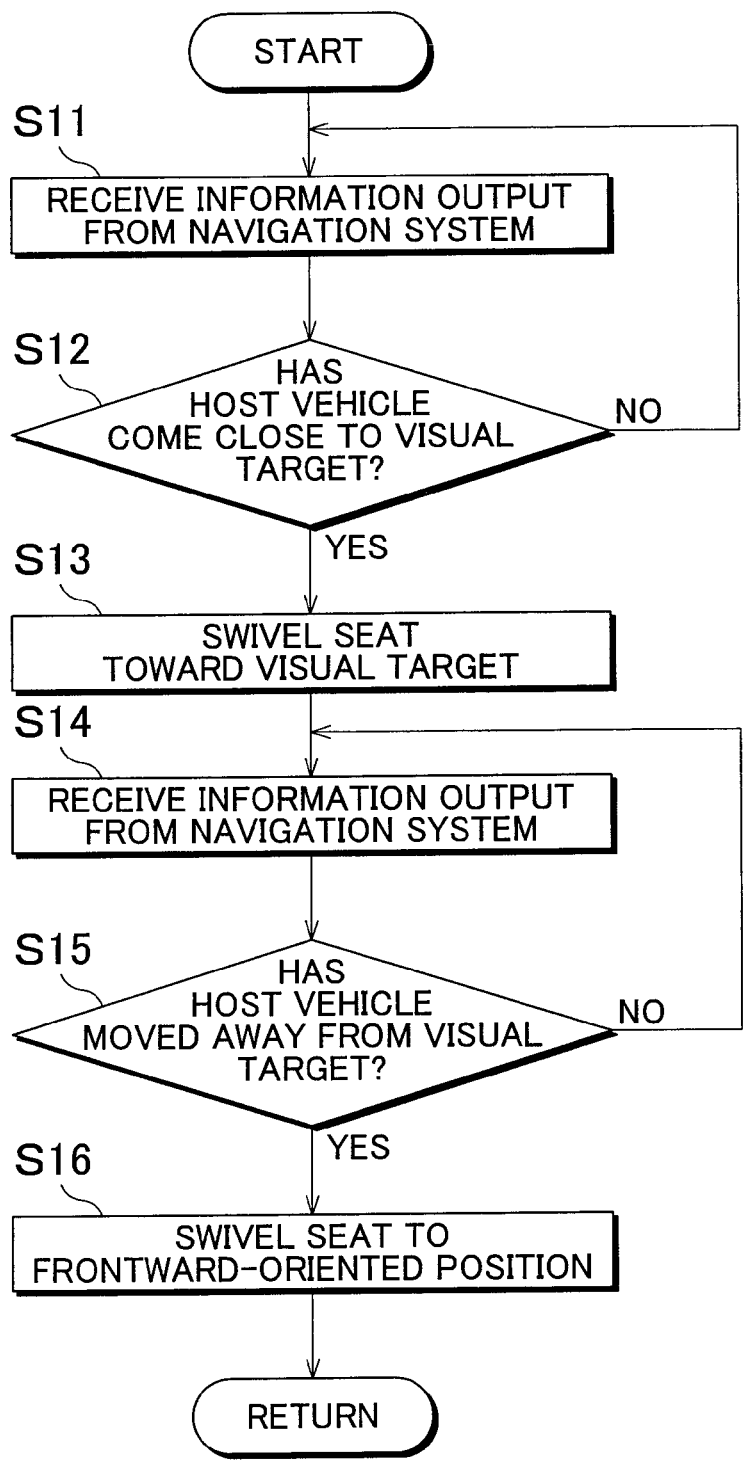
FIG. 10 is a flowchart showing the routine executed by an ECU in the visibility improvement mode.

FIG. 9 is a flowchart showing the routine executed by the traveling road information obtainment unit 38 in the visual target information output mode. FIG. 10 is a flowchart showing the routine executed by the ECU 26 in the visibility improvement mode.

When placed in the visual target information output mode, the traveling road information obtainment unit 38 executes the program shown in the flowchart in FIG. 9. After starting the program, the traveling road information obtainment unit 38 first obtains the information on the current distance between the host vehicle and the visual target and the information on the current orientation of the visual target with respect to the host vehicle from the map information storage unit 36 based on the traveling location of the host vehicle that is obtained from the GPS 40 (step (hereinafter, referred to as "S") 1). Then, the traveling road information obtainment unit 38 provides the ECU 26 with the information obtained in S1 (S2).

Next, the traveling road information obtainment unit 38 determines whether the ECU 26 has completed the visibility improvement mode (S3). If it is determined that the ECU 26 has not completed the visibility improvement mode and is still in the visibility improvement mode, the traveling road information obtainment unit 38 executes S1 again. The traveling road information obtainment unit 38 periodically executes S1 to S3 until a power supply is turned off or until the traveling road information obtainment unit 38 is placed in the traveling road information output mode.

When placed in the visibility improvement mode, the ECU 26 executes the program shown in the flowchart in FIG. 10. After starting the program, the ECU 26 first obtains the information output from the traveling road information obtainment unit 38 of the navigation system 24, that is, the information on the current distance between the host vehicle and the visual target and the information on the current orientation of the visual target with respect to the host vehicle (S11).

Next, when receiving the information output from the traveling road information obtainment unit 38, the ECU 26 calculates the current distance between the host vehicle and the visual target based on the information output from the traveling road information obtainment unit 38, and determines whether the host vehicle has come close to the visual target (S12).

When the current distance between the host vehicle and a visual target 44 is equal to or longer than a predetermined distance as shown in FIG. 2A, the ECU 26 determines that the host vehicle has not come close to the visual target 44, and executes S11 again.

On the other hand, when the current distance between the host vehicle and the visual target 44 falls below the predetermined distance as shown in FIG. 2B, the ECU 26 determines that the host vehicle has come close to the visual target 44. In this case, the ECU 26 provides the motor drive unit 30 with a control signal indicating a command to swivel the second-row driver-side seat 14 toward the visual target 44 (that is, toward the outward-oriented position), and provides the motor drive unit 34 with a control signal indicating a command to swivel the second-row passenger-side seat 18 toward the visual target 44 (that is, toward the inward-oriented position) (S13).

Thus, the second-row driver-side seat 14 and the second-row passenger-side seat 18 are automatically swiveled toward the visual target 44, as shown in FIG. 2B.

As described above, with the vehicle seat apparatus 10 according to the embodiment of the invention, when the host vehicle comes close to a preset specific visual target, the second-row driver-side seat 14 and the second-row passenger-side seat 18 are swiveled toward the visual target. Therefore, the occupants seated in the second-row driver-side seat 14 and the second-row passenger-side seat 18 can see the visual target more easily.

Next, the ECU 26 receives the information output from the traveling road information obtainment unit 38 again (S14). The ECU 26 calculates the current distance between the host vehicle and the visual target based on the information output from the traveling road information obtainment unit 38, and determines whether the host vehicle has moved away from the visual target (S15).

When the current distance between the host vehicle and the visual target 44 is still shorter than a predetermined distance as shown in FIG. 2B, the ECU 26 determines that the host vehicle has not moved away from the visual target, and executes S14 again.

On the other hand, when the current distance between the host vehicle and the visual target 44 is equal to or longer than the predetermined distance, the ECU 26 determines that the host vehicle has moved away from the visual target 44. In this case, the ECU 26 provides the motor drive unit 30 with a control signal indicating a command to swivel the second-row driver-side seat 14 to the frontward-oriented position, and provides the motor drive unit 34 with a control signal indicating a command to swivel the second-row passenger-side seat 18 to the frontward-oriented position (S16).

Thus, the second-row driver-side seat 14 and the second-row passenger-side seat 18 are automatically swiveled toward the frontward-oriented positions.

As described above, with the vehicle seat apparatus 10 according to the embodiment of the invention, when the second-row driver-side seat 14 and the second-row passenger-side seat 18 are swiveled toward the visual target and then the host vehicle moves away from the visual target, the second-row driver-side seat 14 and the second-row passenger-side seat 18 are automatically swiveled toward the frontward-oriented positions. Therefore, it is possible to omit the operation for returning the second-row driver-side seat 14 and the second-row passenger-side seat 18 to the frontward-oriented positions. As a result, it is possible to improve the usability of the second-row driver-side seat 14 and the second-row passenger-side seat 18.

The ECU 26 periodically executes S11 to S16 until the power supply is turned off or until the ECU 26 is placed in a mode other than the visibility improvement mode.

Figure 11:
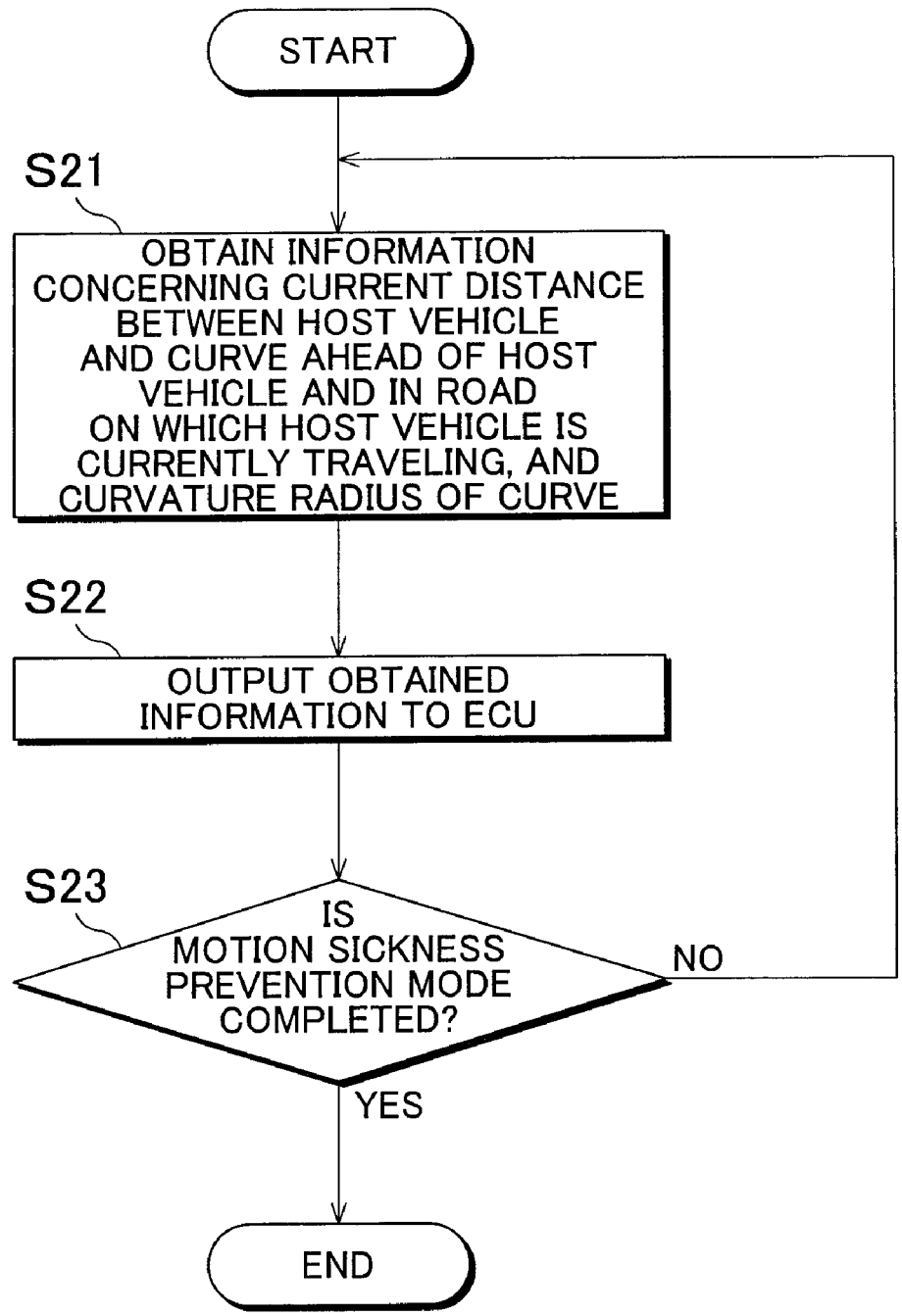
FIG. 11 is a flowchart showing the routine executed by the traveling road information obtainment unit in the traveling road information output mode.
Figure 12:
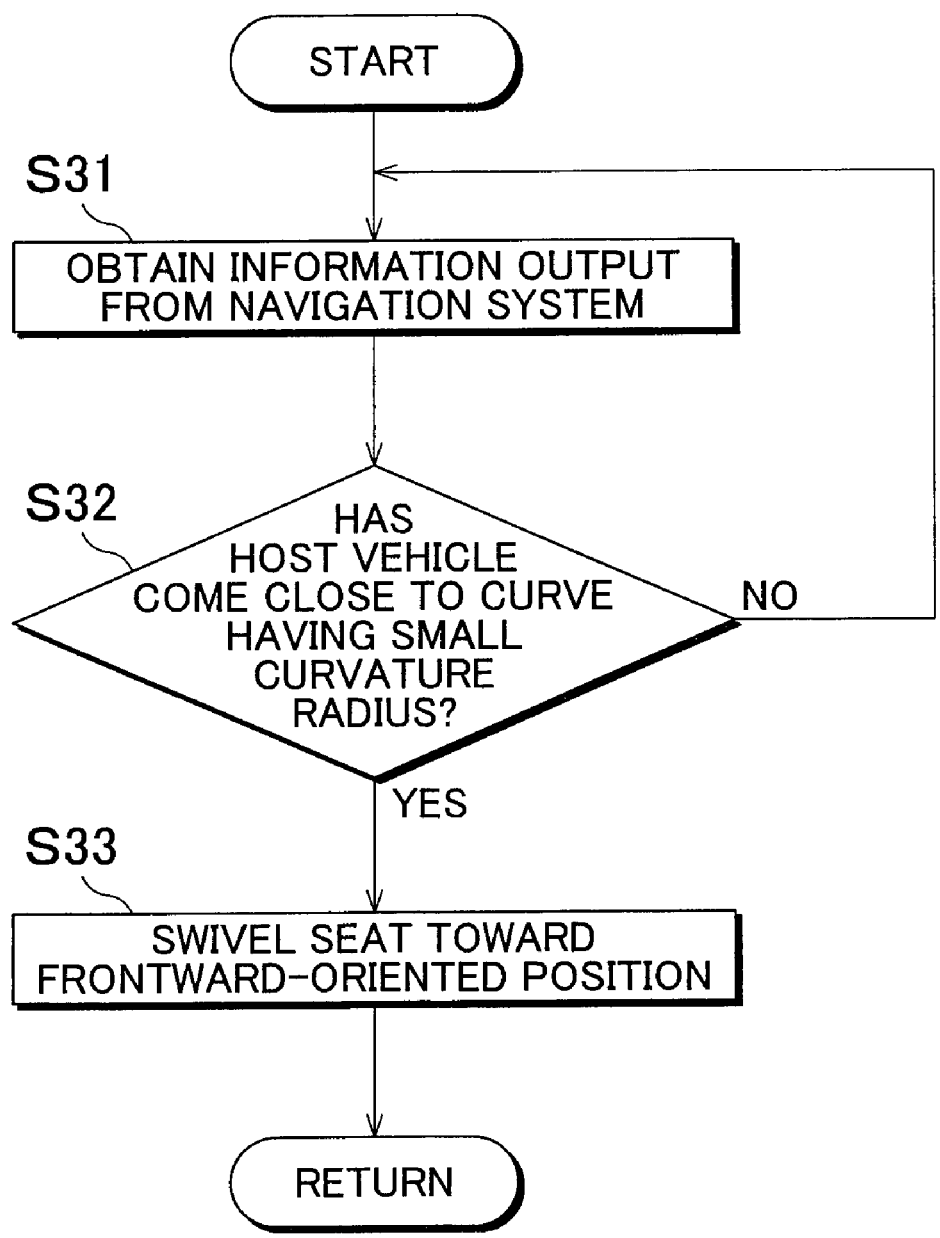
FIG. 12 is a flowchart showing the routine executed by the ECU in the motion sickness prevention mode.

Next, the motion sickness prevention mode will be described. FIG. 11 is a flowchart showing the routine executed by the traveling road information obtainment unit 38 in the traveling road information output mode. FIG. 12 is a flowchart showing the routine executed by the ECU 26 in the motion sickness prevention mode.

When placed in the traveling road information output mode, the traveling road information obtainment unit 38 executes the program shown in the flowchart in FIG. 11. After starting the program, the traveling road information obtainment unit 38 first obtains the information on the current distance between the host vehicle and a curve that is ahead of the host vehicle and that is in the road on which the host vehicle is traveling, and the information on the curvature radius of the curve from the map information storage unit 36 based on the traveling location of the host vehicle that is obtained from the GPS 40 (S21). Then, the traveling road information obtainment unit 38 provides the ECU 26 with the information obtained in S21 (S22).

Next, the traveling road information obtainment unit 38 determines whether the ECU 26 has completed the motion sickness prevention mode (S23). When it is determined that the ECU 26 has not completed the motion sickness prevention mode and is still in the motion sickness prevention mode, the ECU 26 executes S21 again. The traveling road information obtainment unit 38 periodically executes S21 to S23 until the power supply is turned off or until the traveling road information obtainment unit 38 is placed in the visual target information output mode.

When placed in the motion sickness prevention mode, the ECU 26 executes the program shown in the flowchart in FIG. 12. After starting the program, the ECU 26 first obtains the information output from the traveling road information obtainment unit 38 of the navigation system 24, that is, the information on the current distance between the host vehicle and a curve that is ahead of the host vehicle and that is in the road on which the host vehicle is traveling, and the information on the curvature radius of the curve (S31).

Next, when receiving the information output from the traveling road information obtainment unit 38, the ECU 26 calculates the current distance between the host vehicle and the curve that is ahead of the host vehicle and that is in the road on which the host vehicle is traveling and the curvature radius of the curve based on the information output from the traveling road information obtainment unit 38. The ECU 26 determines whether the host vehicle has come close to the curve, and determines whether the curvature radius of the curve is small. That is, the ECU 26 determines whether the host vehicle has come close to the curve that has a small curvature radius (S32).

Figure 3A:
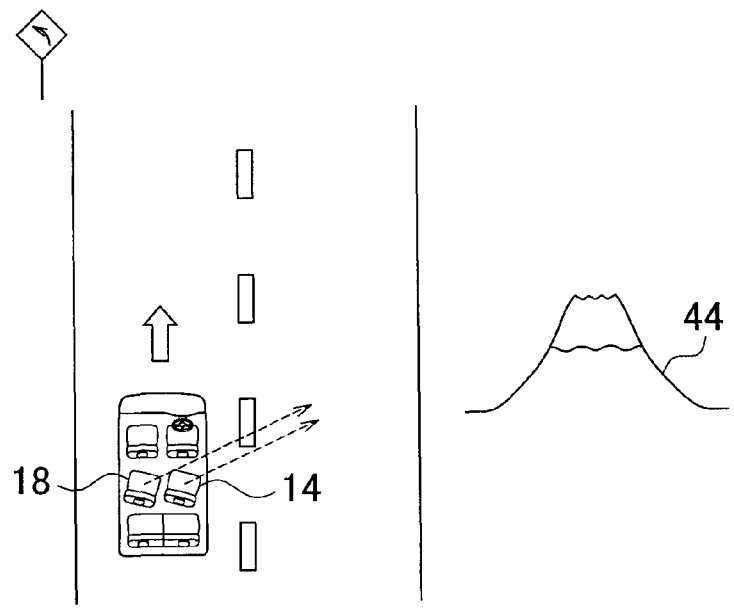
FIGS. 3A and 3B are views showing an example of the operation of the vehicle seat apparatus shown in FIG. 1.

When the host vehicle is traveling on a straight road and the distance between the host vehicle and the curve having a small curvature radius is equal to or longer than a predetermined distance as shown in FIG. 3A, the ECU 26 determines that the host vehicle has not come close to the curve having a small curvature radius, and executes S31 again.

That is, as shown in FIG. 3A, for example, when the second-row driver-side seat 14 and the second-row passenger-side seat 18 have been automatically swiveled toward the visual target 44 in the visibility improvement mode or when the occupants seated in the second-row driver-side seat 14 and the second-row passenger-side seat 18 have manually or electrically swiveled these seats toward the visual target 44, the state in which the second-row driver-side seat 14 and the second-row passenger-side seat 18 are oriented toward the visual target 44 is maintained.

Figure 3B:
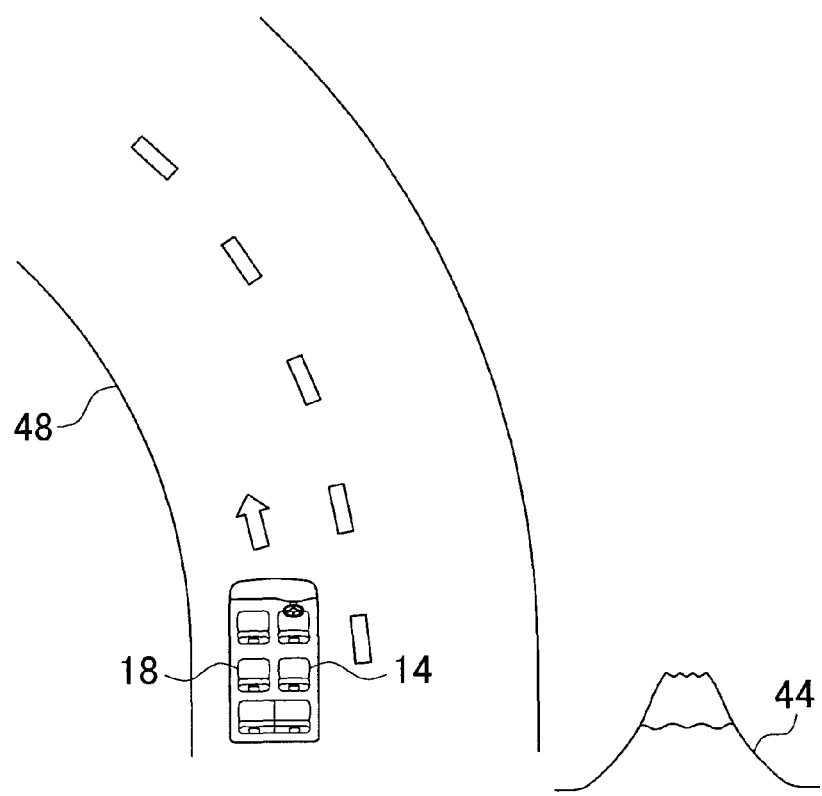

On the other hand, when the host vehicle reaches the entrance of a curve that has a small curvature radius as shown in FIG. 3B, the ECU 26 determines that the host vehicle has come close to a curve 48 that has a small curvature radius. In this case, the ECU 26 provides the motor drive unit 30 with a control signal indicating a command to swivel the second-row driver-side seat 14 to the frontward-oriented position, and provides the motor drive unit 34 with a control signal indicating a command to swivel the second-row passenger-side seat 18 to the frontward-oriented position (S33).

Thus, the second-row driver-side seat 14 and the second-row passenger-side seat 18 are automatically swiveled to the frontward-oriented positions, as shown in FIG. 3B.

As described above, with the vehicle seat apparatus 10 according to the embodiment of the invention, even if each of the second-row driver-side seat 14 and the second-row passenger-side seat 18 has been swiveled to the outward-oriented position or the inward oriented position, when the host vehicle goes round a curve that has a small curvature radius, each of the second-row driver-side seat 14 and the second-row passenger-side seat 18 is swiveled from the outward oriented position or the inward-oriented position to the frontward-oriented position. Thus, it is possible to prevent the occupants seated in the second-row driver-side seat 14 and the second-row passenger-side seat 18 from getting, for example, a motion sickness.

The ECU 26 periodically executes S31 to S33 until the power supply is turned off or until the ECU 26 is placed in a mode other than the motion sickness prevention mode.

Next, the holding stability improvement mode will be described. FIG. 13 is a flowchart showing the routine executed by the ECU 26 in the holding stability improvement mode.

When placed in the holding stability improvement mode, the ECU 26 executes the program shown in the flowchart in FIG. 13. After starting the program, the ECU 26 receives the information output from the traveling road information obtainment unit 38 of the navigation system 24, that is, the information on the direction in which the host vehicle will travel along the road ahead of the host vehicle (S41).

Next, when receiving the information output from the traveling road information obtainment unit 38, the ECU 26 detects the direction in which the host vehicle will travel along the road ahead of the host vehicle based on the information output from the traveling road information obtainment unit 38 (S42).

Then, the ECU 26 provides the motor drive unit 30 with a control signal indicating a command to swivel the second-row driver-side seat 14 so that the second-row driver-side seat 14 is oriented in the direction in which the host vehicle will travel along the road ahead of the host vehicle, and provides the motor drive unit 34 with a control signal indicating a command to swivel the second-row passenger-side seat 18 so that the second-row passenger-side seat 18 is oriented in the direction in which the host vehicle will travel along the road ahead of the vehicle (S43).

Figure 4A:
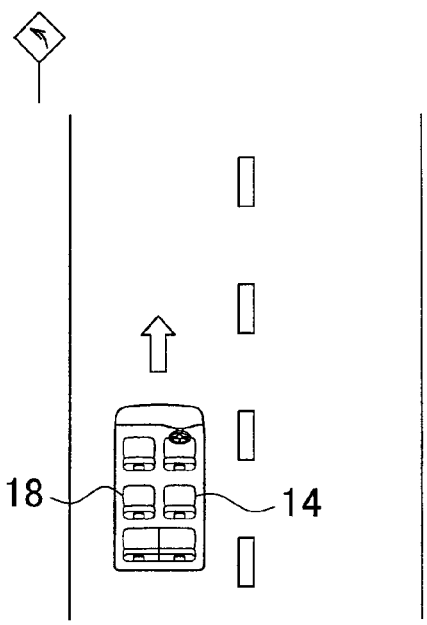
FIGS. 4A and 4B are views showing an example of the operation of the vehicle seat apparatus shown in FIG. 1.
Figure 4B:
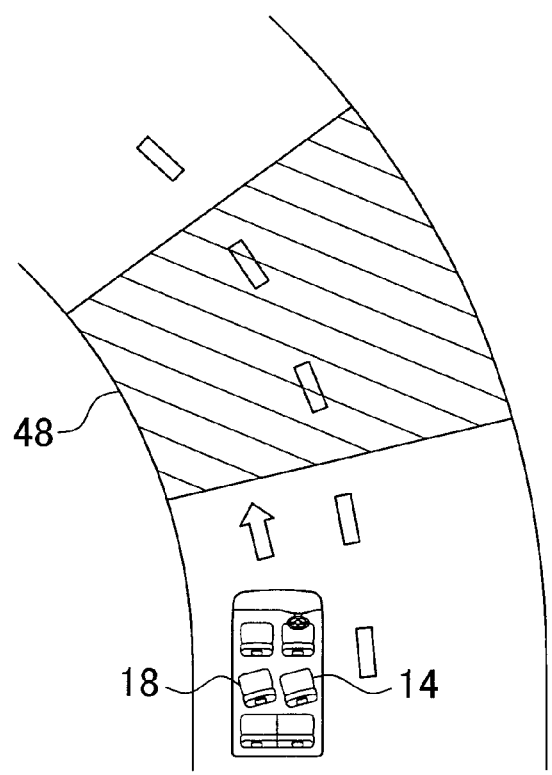

Thus, when the host vehicle is traveling on a straight road, for example, as shown in FIG. 4A, the second-row driver-side seat 14 and the second-row passenger-side seat 18 are kept in the frontward-oriented positions. On the other hand, when the host vehicle goes round the curve 48 as shown in FIG. 4B, the second-row driver-side seat 14 and the second-row passenger-side seat 18 are automatically swiveled before the host vehicle enters the curve 48 (hatched portion) so that these seat are oriented in the direction in which the host vehicle will travel along the curve 48 (hatched portion).

As described above, with the vehicle seat apparatus 10 according to the embodiment of the invention, the second-row driver-side seat 14 and the second-row passenger-side seat 18 are oriented in the direction in which the host vehicle will travel along the road ahead of the host vehicle. Therefore, when the host vehicle goes round a curve, it is possible to swivel the second-row driver-side seat 14 and the second-row passenger-side seat 18 so that these seats are oriented in the direction in which the host vehicle will travel along the curve. As a result, it is possible to hold the occupants in the seats more stably when the host vehicle is going round the curve.

Then, the ECU 26 periodically executes S41 to S43 until the power supply is turned off or until the ECU 26 is placed in a mode other than the holding stability improvement mode.

Even when the ECU 26 is in the visibility improvement mode, the motion sickness prevention mode or the holding stability improvement mode, if the host vehicle reaches the destination that is input in the navigation system 24 in advance or if the vehicle outside environment in the road on which the host vehicle is traveling changes to a predetermined environment (unsuitable environment described later in detail), the ECU 26 executes the following control in an interrupt manner.

Next, the control that is executed when the host vehicle reaches the destination will be described. When the host vehicle reaches the destination (or the area near the destination) that is input in the navigation system 24 in advance, the traveling road information obtainment unit 38 provides the ECU 26 with the information that the host vehicle has reached the destination.

When receiving the information output from the traveling road information obtainment unit 38, the ECU 26 determines that the host vehicle has reached the destination based on the information. In this case, the ECU 26 provides the motor drive unit 30 with a control signal indicating a command to swivel the second-row driver-side seat 14 to the frontward-oriented position, and provides the motor drive unit 34 with a control signal indicating a command to swivel the second-row passenger-side seat 18 to the frontward-oriented position.

Figure 5A:
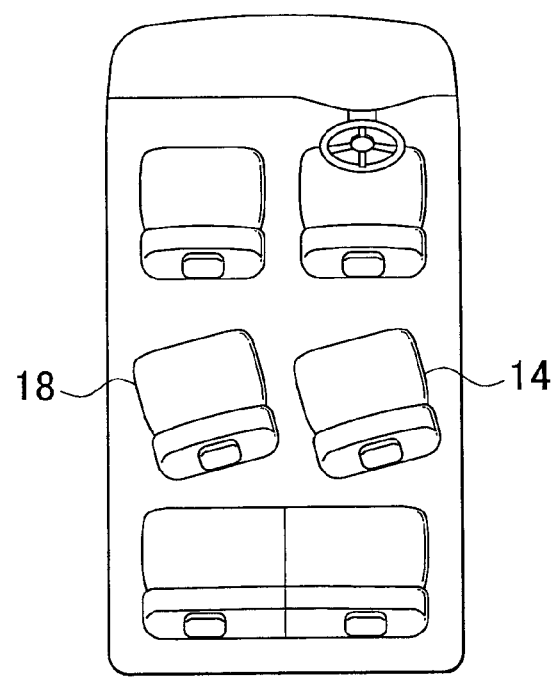
FIGS. 5A and 5B are views showing an example of the operation of the vehicle seat apparatus shown in FIG. 1.
Figure 5B:
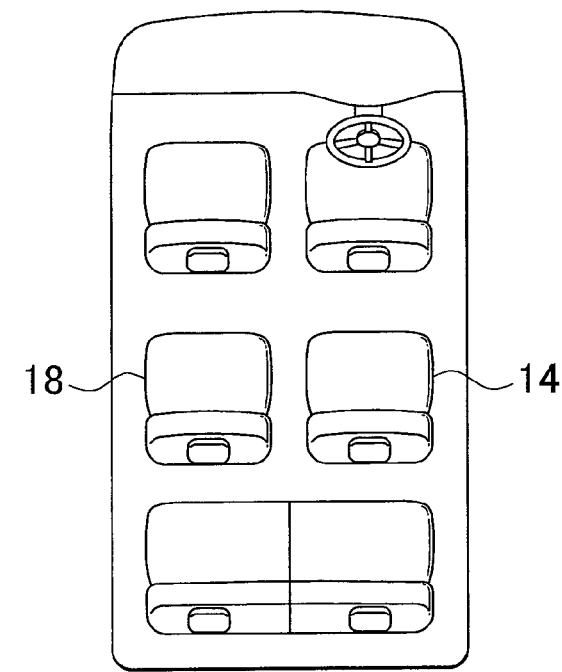

Thus, when the ECU 26 is in the visibility improvement mode, the motion sickness prevention mode, or the holding stability improvement mode, and the second-row driver-side seat 14 and the second-row passenger-side seat 18 are in the inward-oriented position and the outward-oriented position, respectively, for example, as shown in FIG. 5A, both the second-row driver-side seat 14 and the second-row passenger-side seat 18 are automatically swiveled to the frontward-oriented positions as shown in FIG. 5B.

Similarly, when the second-row driver-side seat 14 is in the outward-oriented position and the second-row passenger-side seat 18 is in the inward-oriented position, both the second-row driver-side seat 14 and the second-row passenger-side seat 18 are automatically swiveled to the frontward-oriented positions.

As described above, with the vehicle seat apparatus 10 according to the embodiment of the invention, when the host vehicle reaches the destination set in advance, the second-row driver-side seat 14 and the second-row passenger-side seat 18 are swiveled to the frontward-oriented positions. Thus, it is possible to omit the operation to return the second-row driver-side seat 14 and the second-row passenger-side seat 18 to the frontward-oriented positions, and make it easier for the occupant to get off and on the vehicle at the destination.

Next, the control that is executed when the vehicle outside environment changes will be described.

When the traveling road information obtainment unit 38 obtains the information on the vehicle outside environment in the road on which the host vehicle is currently traveling (for example, the information that the road on which the host vehicle is currently traveling is a rough road or the information that the host vehicle is traveling in a tunnel) from the map information storage unit 36 based on the traveling location of the host vehicle that is obtained from the GPS 40, or when the traveling road information obtainment unit 38 obtains the information on the vehicle outside environment (for example, information on the weather in the area that includes the road on which the host vehicle is currently traveling, information on whether the vehicle is traveling during the daytime or at night, and information on whether the traffic backs up) with the use of the vehicle outside environment detection unit 37, the traveling road information obtainment unit 38 outputs the obtained information to the ECU 26.

When the ECU 26 is in the visibility improvement mode and receives the vehicle outside environment information output from the traveling road information obtainment unit 38, the ECU 26 determines whether the vehicle outside environment in the road on which the host vehicle is traveling is unsuitable for swiveling the second-row driver-side seat 14 and the second-row passenger-side seat 18 toward the visual target.

When the ECU 26 determines that the vehicle outside environment in the road on which the host vehicle is currently traveling is unsuitable for swiveling the second-row driver-side seat 14 and the second-row passenger-side seat 18 toward the visual target (for example, it is rainy, it is cloudy, the host vehicle is traveling at night, the host vehicle is traveling on a rough road or the host vehicle is traveling in a tunnel), the ECU 26 prohibits operations of the motor drive unit 30 and the motor drive unit 34.

Thus, when the ECU 26 is in the visibility improvement mode and, for example, the second-row driver-side seat 14 and the second-row passenger-side seat 18 are in the frontward-oriented positions, the state in which these seats are in the frontward-oriented positions is maintained. For example, when each of the occupants seated in the second-row driver-side seat 14 and the second-row passenger-side seat 18 has manually or electrically swiveled the seat to the outward-oriented position or the inward-oriented position, the state in which each of the second-row driver-side seat 14 and the second-row passenger-side seat 18 is in the outward-oriented position or the inward-oriented position is maintained.

As described above, with the vehicle seat apparatus 10 according to the embodiment of the invention, when the vehicle outside environment in the road on which the host vehicle is traveling is unsuitable for swiveling the second-row driver-side seat 14 and the second-row passenger-side seat 18 toward the visual target (for example, at least one of the condition that it is rainy, the condition that it is cloudy, the condition that the host vehicle is traveling at night, the condition that the host vehicle is traveling on a rough road and the condition that the host vehicle is traveling in a tunnel is satisfied), swiveling of the second-row driver-side seat 14 and the second-row passenger-side seat 18 is prohibited. Thus, it is possible to prevent occurrence of the situation in which the second-row driver-side seat 14 and the second-row passenger-side seat 18 are swiveled toward the visual target although the vehicle outside environment is unsuitable for swiveling the second-row driver-side seat 14 and the second-row passenger-side seat 18 toward the visual target.

As described above in detail, with the vehicle seat apparatus 10 according to the embodiment of the invention, it is possible to automatically swivel the second-row driver-side seat 14 and the second-row passenger-side seat 18 so that the orientations of these seats are suitable for the condition of the road on which the host vehicle is currently traveling. Therefore, it is possible to further improve the comfort in the passenger compartment.

While the invention has been described with reference to the example embodiment thereof, the invention is not limited to the example embodiment. To the contrary, the invention is intended to cover various modifications within a scope of the invention.

For example, in the embodiment of the invention described above, the map information is obtained with the use of the traveling road information obtainment unit 38 of the navigation system 24. Alternatively, the map information may be obtained with the use of outside communication means other than the traveling road information obtainment unit 38.

In the embodiment of the invention described above, the information on the current distance between the visual target and the host vehicle, the information on the current orientation of the visual target with respect to the host vehicle, the information on the current distance between the host vehicle and a curve that is ahead of the host vehicle and that is in the road on which the host vehicle is traveling, the information on the curvature radius of the curve, and the information on the direction in which the host vehicle will travel in the road ahead of the host vehicle are obtained based on the map information stored in the navigation system 24. Alternatively, the above-mentioned information may be obtained based on the traveling road information that is obtained by, for example, a front camera.

In the embodiment of the invention described above, the vehicle seat apparatus 10 includes the second-row driver-side seat 14 and the second-row passenger-side seat 18. Alternatively, the vehicle seat apparatus 10 may include one of the second-row driver-side seat 14 and the second-row passenger-side seat 18.

In the embodiment of the invention described above, the second-row driver-side seat 14 and the second-row passenger-side seat 18 are swiveled based on the information on the road on which the host vehicle is traveling. Alternatively, other vehicle seats (for example, seats other than the driver's seat 12, that is, the passenger's seat 16, a third-row driver-side seat 56, and a third-row passenger-side seat 58) may be swiveled based on the information on the road on which the host vehicle is traveling.

In the embodiment of the invention described above, the visual target is input in the navigation system 24 with the use of the operation unit 42, whereby the visual target is set within the navigation system 24. Alternatively, the visual target may be automatically input in the navigation system 24 as, for example, a recommended spot via, for example, outside communication means, whereby the visual target is set within the navigation system 24.

Further alternatively, fine views such as mountains, coast lines and lakes, and artifacts such as buildings may be stored in advance as recommended spots in the map information storage unit 36 of the navigation system 24. When the destination is input in the navigation system 24 with the use of the operation unit 42, if the recommendation spot is located between the current location of the host vehicle and the destination, the visual target may be automatically set within the navigation system 24 without using the operation unit 42.

In the embodiment of the invention described above, the vehicle seat apparatus 10 is mounted in a passenger automobile, for example, a mini-van. Alternatively, the vehicle seat apparatus 10 may be mounted in other vehicles, for example, automobiles such as a minibus and a motorcoach, a railroad vehicle, a passenger airplane, and a marine vessel.

In the embodiment of the invention described above, when the ECU 26 determines that the host vehicle has reached the preset destination based on the information output from the traveling road information obtainment unit 38, the ECU 26 controls the motor drive unit 30 and the motor drive unit 34 so that each of the second-row driver-side seat 14 and the second-row passenger-side seat 18 is swiveled from the outward-oriented position or the inward-oriented position to the frontward-oriented position. Alternatively, the following configuration may be employed.

That is, if the ECU 26 is in the visibility improvement mode, the motion sickness prevention mode, or the holding stability improvement mode, and the second-row driver-side seat 14 and the second-row passenger-side seat 18 are in the frontward-oriented positions as shown in FIG. 6A, when the ECU 26 determines that the host vehicle has reached the preset destination based on the information output from the traveling road information obtainment unit 38, the ECU 26 may control the motor drive unit 30 and the motor drive unit 34 so that the second-row driver-side seat 14 and the second-row passenger-side seat 18 are swiveled toward doors 60 and 62, respectively.

With this configuration, when the host vehicle has reached the destination set in advance, the second-row driver-side seat 14 and the second-row passenger-side seat 18 are swiveled toward the doors 60 and 62, respectively. Thus, the occupants can get off and on the vehicle at the destination more easily.

In the embodiment of the invention described above, when the ECU 26 determines that the vehicle outside environment in the road on which the host vehicle is traveling is unsuitable for swiveling the vehicle seats toward the visual target (for example, it is rainy, it is cloudy, the host vehicle is traveling at night, the host vehicle is traveling on a rough road or the host vehicle is traveling in a tunnel) based on the information on the vehicle outside environment that is output from the traveling road information obtainment unit 38, the ECU 26 prohibits operations of the motor drive unit 30 and the motor drive unit 34. Alternatively, the following configuration may be employed.

That is, when each of the second-row driver-side seat 14 and the second-row passenger-side seat 18 is placed in the outward-oriented position or the inward-oriented position by being manually or electrically swiveled or by being swiveled toward the visual target, and the ECU 26 determines that the vehicle outside environment in the road on which the host vehicle is traveling is unsuitable for keeping each of the second-row driver-side seat 14 and the second-row passenger-side seat 18 in the outward-oriented position or the frontward-oriented position (for example, at least one of the condition that it is rainy, the condition that it is cloudy, the condition that the host vehicle is traveling at night, the condition that the traffic backs up, the condition that the host vehicle is traveling on a rough road and the condition that the host vehicle is traveling in a tunnel is satisfied), the ECU 26 may control the motor drive unit 30 and the motor drive unit 34 so that each of the second-row driver-side seat 14 and the second-row passenger-side seat 18 is swiveled from the outward oriented position or the frontward-oriented position to the inward-oriented position.

Figure 7A:
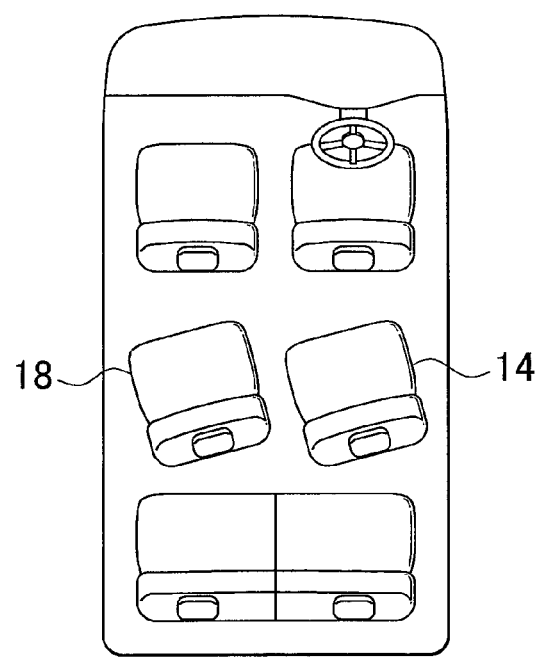
FIGS. 7A and 7B are views showing an example of the operation of the vehicle seat apparatus shown in FIG. 1.

That is, for example, when the second-row driver-side seat 14 and the second-row passenger-side seat 18 are in the inward-oriented position and the outward-oriented position, respectively, at which these seats are oriented toward the visual target as shown in FIG. 7A, and the vehicle outside environment changes to the above-described unsuitable environment (for example, at least one of the condition that it is rainy, the condition that it is cloudy, the condition that the host vehicle is traveling at night, the condition that the traffic backs up, the condition that the host vehicle is traveling on a rough road and the condition that the host vehicle is traveling in a tunnel is satisfied), the second-row passenger-side seat 18 may be swiveled from the outward-oriented position to the inward-oriented position.

Thus, when the vehicle outside environment in the road on which the host vehicle is traveling is unsuitable for keeping the second-row driver-side seat 14 and the second-row passenger-side seat 18 in the outward-oriented positions or the frontward-oriented positions, the second-row driver-side seat 14 and the second-row passenger-side seat 18 are swiveled toward the inward-oriented positions. Therefore, it is possible to create the environment under which the occupants can communicate with each other more easily.

Figure 7B:
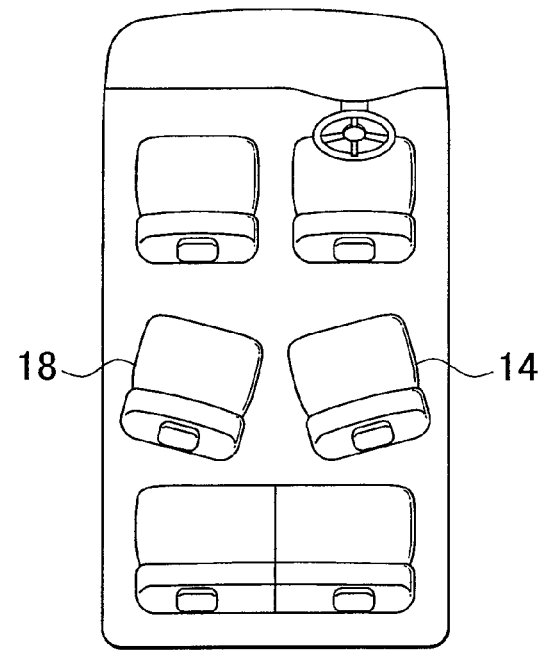
Figure 8A:
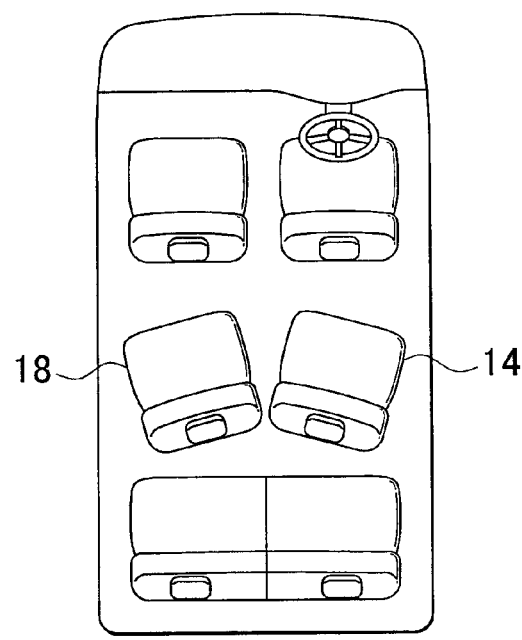
FIGS. 8A and 8B are views showing an example of the operation of the vehicle seat apparatus shown in FIG. 1.
Figure 8B:
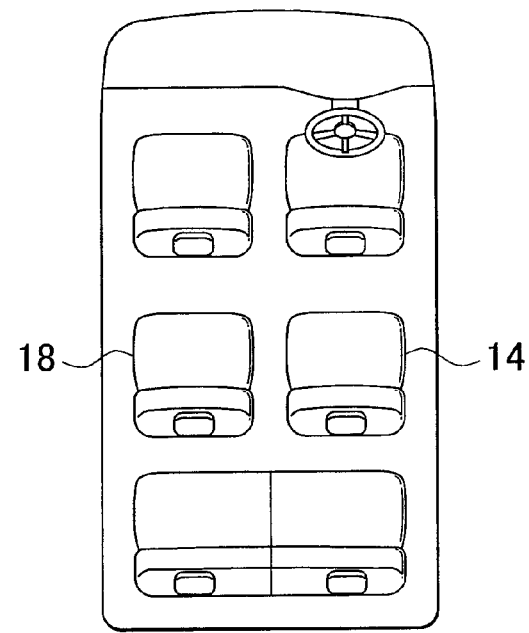

In addition, when the second-row driver-side seat 14 and the second-row passenger-side seat 18 are in the outward-oriented positions by being manually or electrically swiveled or by being swiveled toward the visual target, and the ECU 26 determines that the vehicle outside environment in the road on which the host vehicle is traveling is unsuitable for keeping the second-row driver-side seat 14 and the second-row passenger-side seat 18 in the outward-oriented positions (for example, at least one of the condition that it is rainy, the condition that it is cloudy, the condition that the vehicle is traveling at night, the condition that traffic backs up, the condition that the vehicle is traveling on a rough road, and the condition that the vehicle is traveling in a tunnel is satisfied) based on the information on the vehicle outside environment that is output from the traveling road information obtainment unit 38, the ECU 26 may control the motor drive unit 30 and the motor drive unit 34 so that the second-row driver-side seat 14 and the second-row passenger-side seat 18 are swiveled to the frontward-oriented positions as shown in FIG. 8B, or so that the second-row driver-side seat 14 and the second-row passenger-side seat 18 are swiveled toward the inward-oriented positions as shown in FIG. 7B.

Thus, if the vehicle outside environment in the road on which the host vehicle is traveling is unsuitable for keeping the second-row driver-side seat 14 and the second-row passenger-side seat 18 in the outward-oriented positions, the second-row driver-side seat 14 and the second-row passenger-side seat 18 are swiveled from the outward-oriented positions to the frontward-oriented positions or the inward-oriented positions. Thus, it is possible to prevent occurrence of the situation in which the second-row driver-side seat 14 and the second-row passenger-side seat 18 are kept in the outward-oriented positions although the vehicle outside environment in the road on which the host vehicle is traveling is unsuitable for keeping the second-row driver-side seat 14 and the second-row passenger-side seat 18 in the outward-oriented positions.

While the invention has been described with reference to an example embodiment thereof, it is to be understood that the invention is not limited to the example embodiment or constructions. To the contrary, the invention is intended to cover various modifications and equivalent arrangements. In addition, while the various elements of the example embodiment are shown in various combinations and configurations, which are example, other combinations and configurations, including more, less or only a single element, are also within the scope of the invention.

What is claimed is:

1. A vehicle seat apparatus, comprising:
    a vehicle seat;
    a swiveling drive unit that swivels the vehicle seat between a frontward-oriented position in which the vehicle seat faces a front of a vehicle and at least one of an outward-oriented position in which the vehicle seat is oriented in an outward direction of the vehicle and an inward-oriented position in which the vehicle seat is oriented in an inward direction of the vehicle;
    a traveling route information obtainment unit that obtains information on a traveling route along which the vehicle travels, wherein the traveling route information obtainment unit includes a map information obtainment unit that obtains map information; and
    a control unit that controls an operation of the swiveling drive unit based on the information obtained by the traveling route information obtainment unit;
    wherein when the control unit determines that the vehicle has come close to a preset specific visual target based on information obtained by the map information obtainment unit, the control unit controls the operation of the swiveling drive unit so that the vehicle seat is swiveled toward the preset specific visual target.

2. The vehicle seat apparatus according to claim 1, wherein:
    the map information includes the traveling route along which the vehicle travels as the traveling route information.

3. The vehicle seat apparatus according to claim 2, wherein:
    the swiveling drive unit is able to swivel the vehicle seat from a position in which the vehicle seat is oriented toward the visual target to the frontward-oriented position; and
    in a case where the vehicle seat is swiveled toward the visual target and then the control unit determines that the vehicle has moved away from the preset specific visual target based on the information obtained by the map information obtainment unit, the control unit controls the operation of the swiveling drive unit so that the vehicle seat is swiveled from the position in which the vehicle seat is oriented toward the visual target to the frontward-oriented position.

4. The vehicle seat apparatus according to claim 2, wherein:
    the traveling route information obtainment unit includes a vehicle outside environment information obtainment unit that obtains information on a vehicle outside environment in the traveling route along which the vehicle travels as the traveling route information; and
    when the control unit determines that the vehicle outside environment is unsuitable for swiveling the vehicle seat toward the visual target based on the information obtained by the vehicle outside environment information obtainment unit, the control unit prohibits the operation of the swiveling drive unit.

5. The vehicle seat apparatus according to claim 4, wherein when the control unit determines that a condition of the vehicle outside environment corresponds to at least one of a condition that it is rainy, a condition that it is cloudy, a condition that the vehicle is traveling at night, a condition that the vehicle is traveling on a rough road, and a condition that the vehicle is traveling in a tunnel, the control unit prohibits the operation of the swiveling drive unit.

6. The vehicle seat apparatus according to claim 2, wherein:
    the swiveling drive unit is able to swivel the vehicle seat from the outward oriented position or the inward-oriented position to the frontward-oriented position; and
    when the vehicle seat is in the outward-oriented position or the inward-oriented position and the control unit determines that the vehicle travels in a curve based on the information obtained by the map information obtainment unit, the control unit controls the operation of the swiveling drive unit so that the vehicle seat is swiveled from the outward-oriented position or the inward-oriented position to the frontward-oriented position.

7. The vehicle seat apparatus according to claim 2, wherein:
    the swiveling drive unit is able to swivel the vehicle seat between the outward-oriented position and the inward-oriented position; and
    the control unit detects a direction in which the vehicle travels along the traveling route ahead of the vehicle based on the information obtained by the map information obtainment unit, and controls the operation of the swiveling drive unit so that the vehicle seat is oriented in the direction in which the vehicle travels along the traveling route ahead of the vehicle.

8. The vehicle seat apparatus according to claim 2, wherein:
    the swiveling drive unit is able to swivel the vehicle seat from the outward-oriented position or the inward-oriented position to the frontward-oriented position; and when the vehicle seat is in the outward-oriented position or the inward-oriented position and the control unit determines that the vehicle has reached a preset destination based on the information obtained by the map information obtainment unit, the control unit controls the operation of the swiveling drive unit so that the vehicle seat is swiveled from the outward-oriented position or the inward-oriented position to the frontward-oriented position.

9. The vehicle seat apparatus according to claim 2, wherein when the control unit determines that the vehicle has reached a preset destination based on the information obtained by the map information obtainment unit, the control unit controls the operation of the swiveling drive unit so that the vehicle seat is swiveled toward a door.

10. The vehicle seat apparatus according to claim 2, wherein:
   the swiveling drive unit is able to swivel the vehicle seat from the outward-oriented position or the frontward-oriented position to the inward-oriented position;
   the traveling route information obtainment unit includes a vehicle outside environment information obtainment unit that obtains information on a vehicle outside environment in the traveling route along which the vehicle travels as the traveling route information; and
   when the vehicle seat is in the outward-oriented position or the frontward-oriented position and the control unit determines that the vehicle outside environment is unsuitable for keeping the vehicle seat in the outward-oriented position or the frontward-oriented position based on the information obtained by the vehicle outside environment information obtainment unit, the control unit controls the operation of the swiveling drive unit so that the vehicle seat is swiveled from the outward-oriented position or the frontward-oriented position to the inward-oriented position.

11. The vehicle seat apparatus according to claim 10, wherein when the control unit determines that a condition of the vehicle outside environment corresponds to at least one of a condition that it is rainy, a condition that it is cloudy, a condition that the vehicle is traveling at night, a condition that traffic backs up, a condition that the vehicle is traveling on a rough road, and a condition that the vehicle is traveling in a tunnel, the control unit controls the operation of the swiveling drive unit so that the vehicle seat is swiveled from the outward-oriented position or the frontward-oriented position to the inward-oriented position.

12. The vehicle seat apparatus according to claim 2, wherein:
   the swiveling drive unit is able to swivel the vehicle seat from the outward-oriented position to the frontward-oriented position or the inward-oriented position;
   the traveling route information obtainment unit includes a vehicle outside environment information obtainment unit that obtains information on a vehicle outside environment in the traveling route along which the vehicle travels as the traveling route information; and
   when the vehicle seat is in the outward-oriented position and the control unit determines that the vehicle outside environment is unsuitable for keeping the vehicle seat in the outward-oriented position based on the information obtained by the vehicle outside environment information obtainment unit, the control unit controls the operation of the swiveling drive unit so that the vehicle seat is swiveled from the outward-oriented position to the frontward-oriented position or the inward-oriented position.

13. The vehicle seat apparatus according to claim 12, wherein when the control unit determines that a condition of the vehicle outside environment corresponds to at least one of a condition that it is rainy, a condition that it is cloudy, a condition that the vehicle is traveling at night, a condition that traffic backs up, a condition that the vehicle is traveling on a rough road, and a condition that the vehicle is traveling in a tunnel, the control unit controls the operation of the swiveling drive unit so that the vehicle seat is swiveled from the outward-oriented position to the frontward-oriented position or the inward-oriented position.

* * * * *